United States Patent [19]
Joannopoulos et al.

[11] Patent Number: 6,058,127
[45] Date of Patent: May 2, 2000

[54] TUNABLE MICROCAVITY AND METHOD OF USING NONLINEAR MATERIALS IN A PHOTONIC CRYSTAL

[75] Inventors: John D. Joannopoulos, Belmont; Pierre R. Villeneuve, Boston; Shanhui Fan, Somerville; Daniel S. Abrams, Cambridge, all of Mass.

[73] Assignee: Massachusetts Institute of Technology, Cambridge, Mass.

[21] Appl. No.: 08/989,432

[22] Filed: Dec. 12, 1997

Related U.S. Application Data

[60] Provisional application No. 60/032,723, Dec. 13, 1996.

[51] Int. Cl.$^7$ ..................................................... H01S 3/08
[52] U.S. Cl. ................................ 372/92; 372/19; 372/20; 372/21; 372/22; 372/96; 372/102
[58] Field of Search ................................ 372/19, 20, 21, 372/22, 92, 96, 98, 102, 109

[56] References Cited

U.S. PATENT DOCUMENTS

| | | | |
|---|---|---|---|
| 4,826,282 | 5/1989 | Alferness | 372/20 X |
| 4,829,535 | 5/1989 | Utaka | 372/50 |
| 5,053,641 | 10/1991 | Cheng et al. | 359/330 |
| 5,245,466 | 9/1993 | Burns et al. | 359/296 |
| 5,363,398 | 11/1994 | Glass et al. | 372/92 |
| 5,379,318 | 1/1995 | Weber | 372/96 |
| 5,440,421 | 8/1995 | Fan et al. | 359/344 |
| 5,452,123 | 9/1995 | Asher et al. | 359/296 |
| 5,473,625 | 12/1995 | Hansen et al. | 372/96 |
| 5,600,483 | 2/1997 | Fan et al. | 359/344 |
| 5,617,445 | 4/1997 | Jewell | 372/96 |
| 5,682,401 | 10/1997 | Joannopoulos et al. | 372/96 |
| 5,804,919 | 9/1998 | Jacobsen et al. | 313/506 |
| 5,838,714 | 11/1998 | Delorme | 372/96 |

FOREIGN PATENT DOCUMENTS

| | | | |
|---|---|---|---|
| WO 96/27225 | 9/1996 | WIPO | 372/92 X |
| WO 96/29621 | 9/1996 | WIPO | 372/92 X |

OTHER PUBLICATIONS

Koops, Hans W.P., "Photonic Crystals Built by Three-Dimensional Additive Lithography Enable Integrated Optics of High Density", presented at the Proceedings of SPIE–The International Society for Optical Engineering, Photorefractive Fiber and Crystal Devices: Materials, Optical Properties, and Applications II, Aug. 5–6, 1996, Denver, CO, SPIE vol. 2849, pp. 248–256.

Arthur McGurn, Physical Review, "Green's–function theory for row and periodic defect arrays in photonic band structures", vol. 53, No. 11, pp. 7059–7064, Mar. 15, 1996.

Hans WP Koops, Proceedings of the SPIE, "Photonic crystals built by three–dimensional additive lithography enable integrated optics of high density", vol. 2849, pp. 248–256, Aug. 5, 1996.

Villeneuve et al., Progress in Quantum Electronics, "Photonic bandgaps in periodic dielectric structures progress in quantum electronics", vol .18, No. 2, pp. 153–200Jan. 1, 1994.

*Primary Examiner*—Brian Healy
*Attorney, Agent, or Firm*—Samuels, Gauthier & Stevens, LLP

[57] ABSTRACT

A nonlinear dielectric material is incorporated within a photonic crystal as a means of changing the refractive index of a defect. In this way, the resonant frequency can be easily adjusted, after fabrication, by external mechanisms (either optical or electronic). The ability to tune the frequency of a resonant mode is useful for constructing photonic integrated devices, thus the invention enables the use of a photonic-crystal microcavity for such purposes. In one embodiment there is provided a photonic crystal having a periodic dielectric structure, and a defect positioned within the structure to define a microcavity. The defect includes a nonlinear material and being adapted to have an induced variation in index of refraction so as to tune the resonant mode of the microcavity.

46 Claims, 4 Drawing Sheets

TUNABLE MICROCAVITY AND METHOD OF USING NONLINEAR MATERIALS IN A PHOTONIC CRYSTAL

PRIORITY INFORMATION

This application claims priority from provisional application Ser. No. 60/032,723 filed Dec. 13, 1996, pending.

SPONSORSHIP INFORMATION

This invention was made with government support under Grant Number 9400334-DMR awarded by the National Science Foundation. The government has certain rights in the invention.

BACKGROUND OF THE INVENTION

The invention relates to photonic crystal tunable microcavities using nonlinear materials.

The introduction of a local defect inside a perfect photonic crystal can generate sharp resonant states within the crystal in the vicinity of the defect. In this way, a photonic crystal can be used to fabricate a high-Q microcavity. The frequency of the resonant modes depends on the size and shape of the defects, and on the refractive index of the materials used in the defect.

Ordinarily, these defects are introduced during crystal fabrication by some mechanical process. Although the frequency of the mode depends on the defect's size, shape, and index of refraction, mechanical alteration of the crystal is not a practical means of tuning the frequency after fabrication.

SUMMARY OF THE INVENTION

Accordingly, the invention provides for the incorporation of a nonlinear dielectric material within a photonic crystal, as a means of changing the refractive index of the defect. In this way, the resonant frequency can be easily adjusted, after fabrication, by external mechanisms (either optical or electronic). Since the ability to tune the frequency of a resonant mode is useful for constructing photonic integrated devices, the invention enables the use of a photonic-crystal microcavity for such purposes.

In one embodiment there is provided a photonic crystal having a periodic dielectric structure, and a defect positioned within the structure to define a microcavity. The defect includes a nonlinear material and being adapted to have an induced variation in index of refraction so as to tune the resonant mode of the microcavity.

DETAILED DESCRIPTION OF THE ILLUSTRATED EMBODIMENTS

Figure 1:
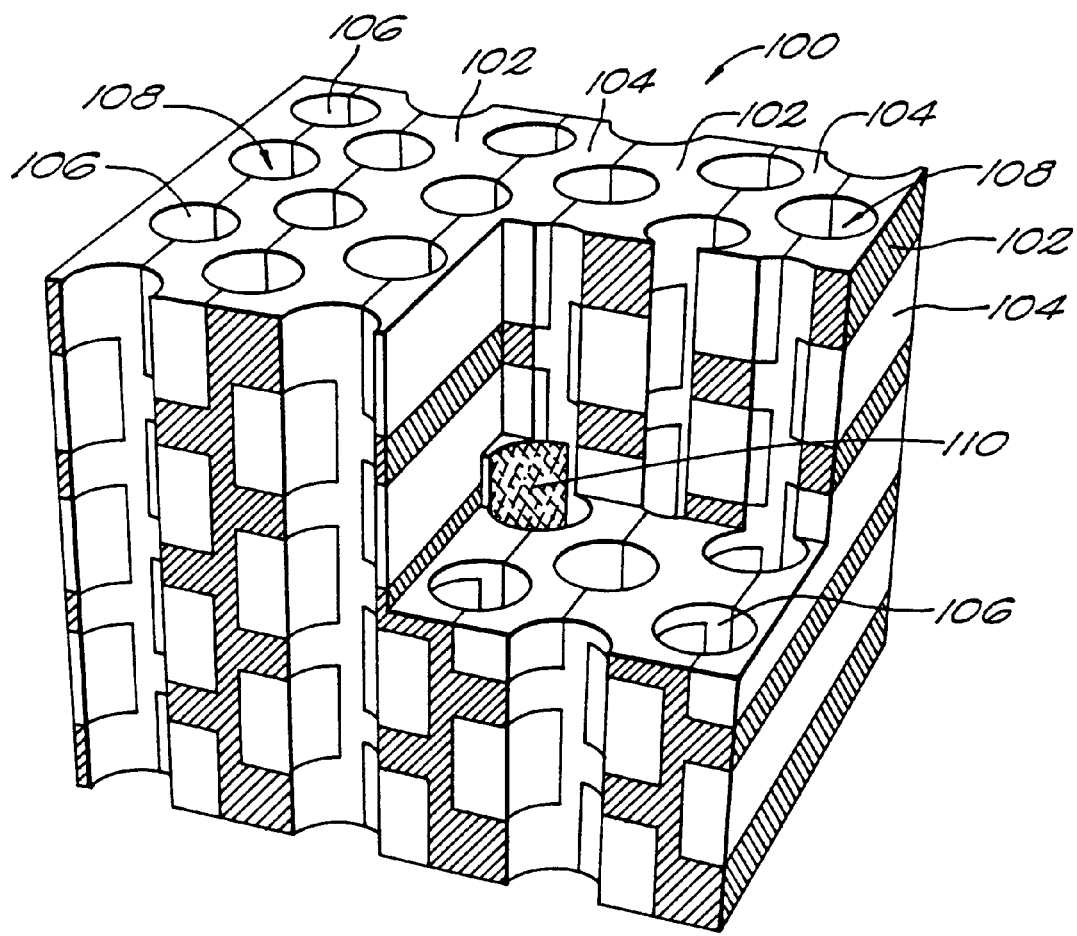
FIG. 1 is a perspective partially cut-away view of a three-dimensionally periodic dielectric tunable photonic crystal microcavity.
Figure 1:
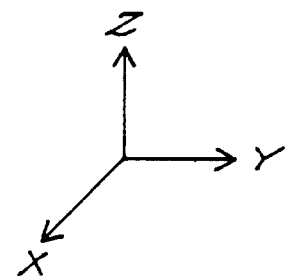

A photonic-crystal microcavity containing nonlinear materials can be used in a vast array of different types of devices, including tunable filters, optical switches and gates, channel drop filters, and optical interconnects. Photonic crystals are particularly well suited for use in integrated devices because they have the ability to generate high-Q modes. Hence, only a small frequency modulation is required to shift a mode over its entire width. This sensitive response is extremely important for an all optical device, because known optical materials are only slightly nonlinear. Photonic crystals can also generate modes that are strongly localized in space. The strong localization is important because the resonant frequency is controlled in a physically small space. Thus, it is possible to use this technique in a small device.

Most mechanisms used for changing the index of refraction rely on nonlinear effects such as the electro-optic effect, the charge carrier effect, or the photorefractive effect. In the microwave frequency regime, the nonlinearity of materials can be large. For example, ferroelectric materials can generate index variations as large as or larger than 25% at or approximate to a frequency of 10 GHz. Typical examples of ferroelectric materials consist of $BaTiO_3$ and $LiNbO_3$.

However, in the optical frequency regime (including infrared), nonlinearities are smaller. Index changes are typically less than 0.1%. In spite of their small magnitudes, these index variations are sufficient for the invention. One particularly promising technique for varying the refractive index of a material at optical frequencies is based on the photoionization of DX centers in certain compound semiconductors such as AlGaAs. The index variation occurs from the capture of electrons by positively charged donors. Each absorbed photon creates a pair of carriers, hence the index change increases linearly with local illumination intensity. This process has the advantage of generating index variations larger than $10^{-3}$, and may be used in the invention. Other techniques may also be useful for the invention, including the use of quantum well devices.

Defects can be fabricated in photonic crystals of any dimensionality, for example, one dimension as described in U.S. Pat. No. 5,682,401 entitled "Resonant Microcavities Employing One Dimensionally Periodic Dielectric Waveguides", two dimensions as described in U.S. patent application Ser. No. 08/395,441 entitled "Resonant Cavities Employing One-dimensionally Periodic Dielectric Materials", or three dimensions as described in U.S. Pat. Nos. 5,440,421 and 5,600,483, both entitled "Three-dimensional Periodic Dielectric Structures Having Photonic Bandgaps", or with the use of metallodielectrics as described in U.S. patent application Ser. No. 08/706,542 entitled "Metallodielectric Photonic Crystal", all of which are incorporated herein by reference. An exemplary embodiment for each dimension is presented hereinafter.

FIG. 1 is a perspective view of an exemplary three-dimensionally periodic dielectric tunable photonic crystal microcavity 100 in accordance with the invention. The photonic crystal microcavity 100 is essentially a structure made of a first material 102 having a first dielectric constant, preferably high index, and parallel rows along the illustrated x-axis of a second material 104, having a second dielectric constant, preferably low index, different than the first dielectric constant. According to an exemplary embodiment, the first material is silicon or gallium arsenide and the second material is silicon dioxide or aluminum oxide, respectively.

The photonic crystal microcavity 100 also includes a series of parallel channels 106 or columns fabricated through the structure in the illustrated z-axis for containing a third material 108 having a third dielectric constant (possibly equal to the second dielectric constant) which preferably has a large index contrast with the first dielectric constant. The use of air columns (dielectric constant of 1) is preferred in order to provide the desired large index contrast between the different materials.

The photonic crystal microcavity 100 can be microfabricated by growing it layer by layer using conventional lithographic techniques. It is expected that ten layers should be sufficient, although some applications may require a smaller or larger number of layers.

The introduction of a defect 110 inside the crystal structure can generate one or more sharp resonant modes in the vicinity of the defect. The defect can be made, for example, by adding, removing, or changing some material inside the crystal during the growth sequence in one of the layers. In the photonic crystal microcavity 100 shown in FIG. 1, the defect 110 consists of a nonlinear material, such as erbium or aluminum gallium arsenide. The frequency of the resonant mode is tuned by varying the refractive index of the nonlinear material. This can be accomplished, for example, by sending current through or applying voltage across the crystal, or by shining light upon it.

Figure 2A:
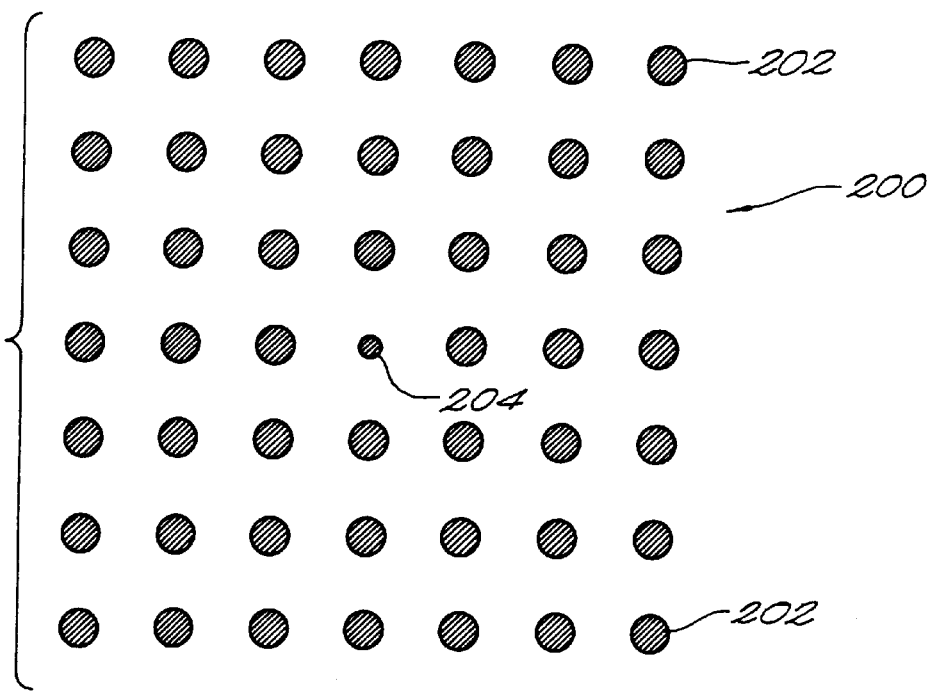
FIG. 2A is a top plan schematic view of an exemplary two-dimensionally periodic dielectric tunable photonic crystal microcavity.

A top plan schematic view of an exemplary two-dimensionally periodic dielectric tunable photonic crystal microcavity 200 is shown in FIG. 2A. The photonic crystal microcavity 200 consists of an array of dielectric rods 202 having a photonic bandgap. As in the three-dimensionally periodic crystal, a defect 204 can be introduced into the crystal structure by adding, removing, or changing some material. The defect can have any shape or size. In this specific embodiment, the radius of one rod is modified to be smaller than the remaining rods 202. By reducing or increasing the radius of the defect, localized modes appear inside the bandgap. It will be appreciated that other configurations of two-dimensionally periodic dielectric photonic crystals are disclosed in copending application Ser. No. 08/395,441.

Figure 2B:
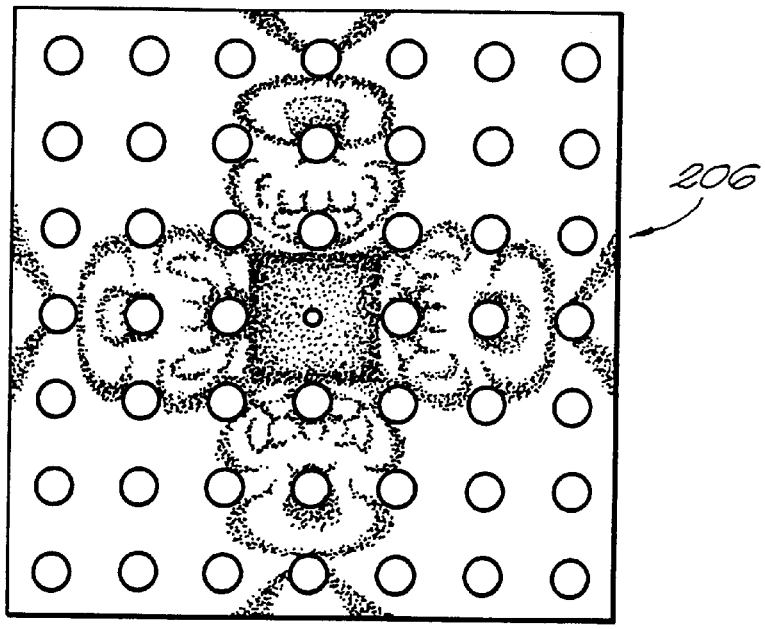
FIG. 2B is an electric field distribution pattern of the resonant mode of the photonic crystal microcavity of FIG. 2A.

FIG. 2B is an electric field distribution pattern 206 of the resonant mode of the photonic crystal microcavity 200 for the case where the radius of the defect (rod 204) is reduced by half. The electric field is polarized along the axis of the rods. In this specific embodiment, every rod is made of nonlinear material. Since the mode is strongly confined, the index of refraction needs to be changed only in the vicinity of the defect in order to tune the frequency of the mode. Consequently, it would also have been possible to tune the frequency of the mode had only one or a few rods been made of nonlinear material in the vicinity of the defect.

In an alternative embodiment, the dielectric rods may be embedded in a dielectric material different than air. By choosing this material to be nonlinear, the tunability of the frequency of the modes can be enhanced.

It will be appreciated that the dielectric rods may be supported on a dielectric substrate or on dielectric stilts, or on a metallic plate or thin film. In addition, the rods can be positioned between dielectric layers or metallic plates. Alternatively, the two dimensionally periodic structure may be configured as an array of air or low index dielectric columns in a high dielectric material.

Figure 3A:
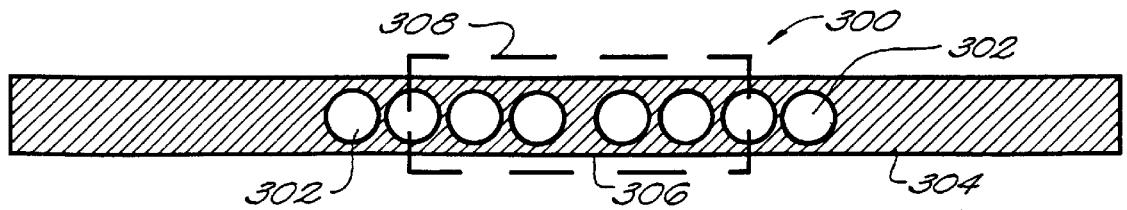
FIG. 3A is a top plan schematic view of an exemplary one-dimensionally periodic dielectric tunable photonic crystal microcavity.

Next, the one-dimensional case is considered, such as a waveguide microcavity with a one-dimensionally periodic dielectric photonic crystal along the axis of the waveguide. FIG. 3A is a top plan schematic view of an exemplary one-dimensionally periodic dielectric tunable photonic crystal microcavity 300. In this specific embodiment, a plurality of holes 302 are etched into a waveguide 304 on either side of a defect 306. Because of its simplicity, this case is studied in more detail, computing the transmission along the waveguide by using a finite-difference time-domain computational method. The fundamental mode of the waveguide is excited at one end of the computational cell and propagates along the waveguide. The electric field is polarized in the plane of the waveguide.

Figure 3B:
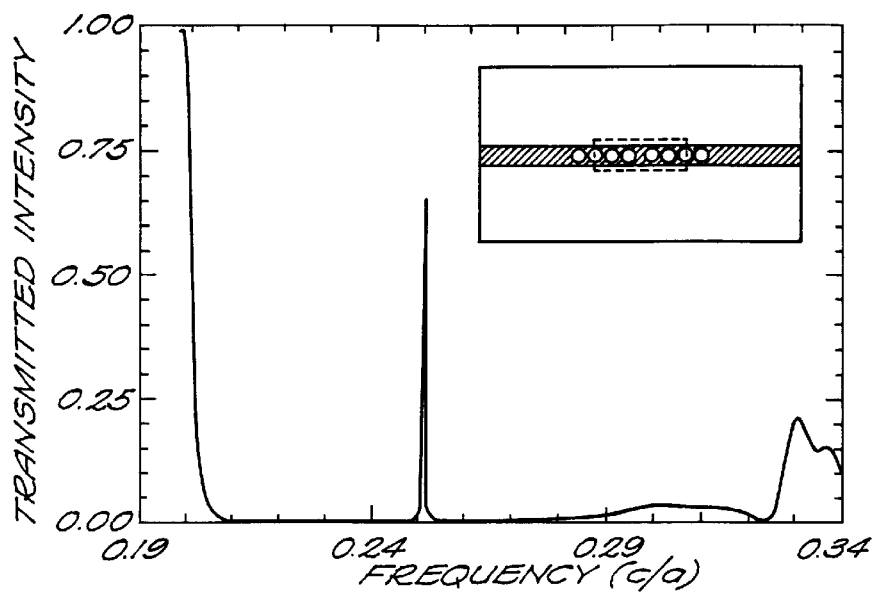
FIG. 3B is a graph of the transmission spectrum through the photonic crystal microcavity normalized with respect to the incident intensity.

FIG. 3B is a graph of the transmission spectrum through the photonic crystal microcavity 300 normalized with respect to the incident intensity. A wide gap can be seen between frequencies f=0.21 c/a and f=0.32 c/a, and a sharp resonant mode appears inside the bandgap at frequency $f_o$=0.25 c/a. The frequency is normalized with respect to a, where a is the distance between holes, center to center. By normalizing the frequency with respect to a, the results can be applied to any given lengthscale. In particular, in the case where the photonic crystal is operated at a wavelength of 1.55 $\mu$m, the outlined waveguide region 308 covers an area of approximately 1 $\mu m^2$.

Figure 3C:
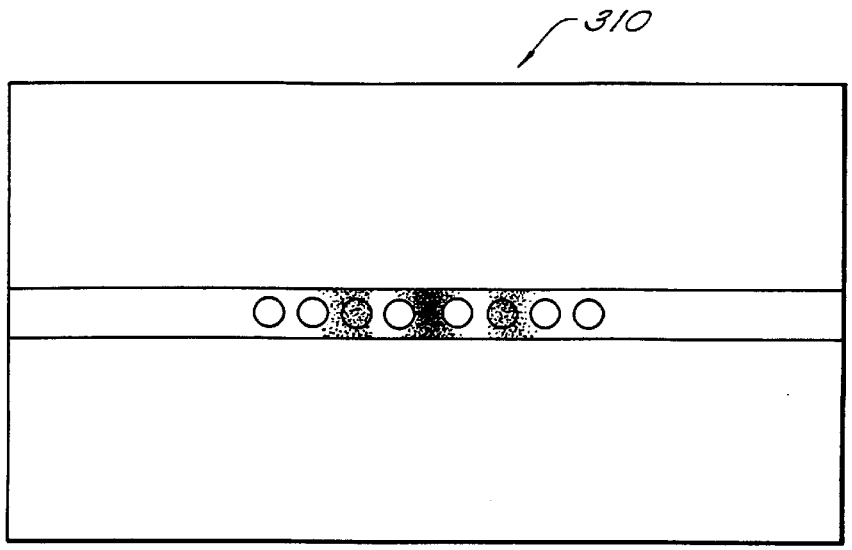
FIG. 3C is an electric field pattern of the resonant mode of the photonic crystal microcavity of FIG. 3A.

FIG. 3C is an electric field pattern 310 of the resonant mode of photonic crystal microcavity 300. The mode is strongly confined in the vicinity of the defect and decays exponentially across the array of holes. The quality factor Q of the cavity, which is a measure of the total losses, is given by $f_o/\Delta f$ where $f_o$ is the resonant frequency and $\Delta f$ is the full width at half-maximum of the resonator's Lorentzian response. In this particular case, the Q-factor is equal to 1300. Since the mode is strongly confined in the vicinity of the defect, only a small area of the photonic crystal needs to be affected to shift the resonance. If it is assumed that a fraction $\sigma$ of the mode is located inside the dielectric material contained within the outlined region 308 in FIG. 3A, the frequency shift $\delta f$ of the resonance will be approximated by $$\delta f = \left[ \frac{1}{1 + \frac{\sigma \delta n}{n}} - 1 \right] f_0 \qquad (1)$$

for small changes of the index $\delta n/n$. The mode shown in FIG. 3C has approximately 80% of its electrical energy density inside the dielectric material.

Figure 4:
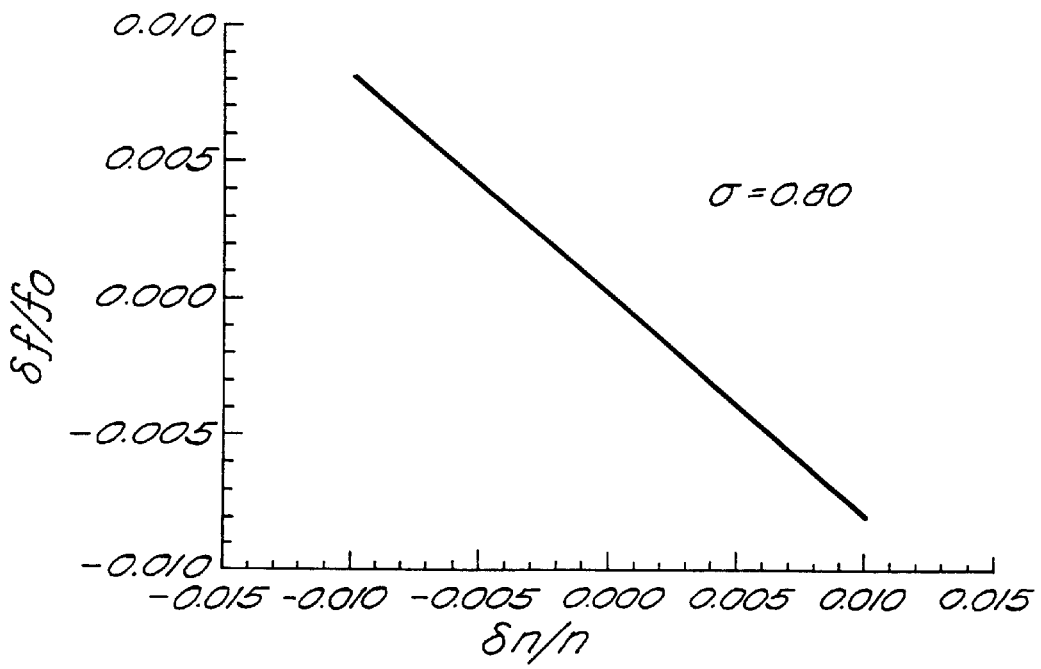
FIG. 4 is a plot of the frequency shift of the microcavity of FIG. 3A for the case where σ=0.80.

FIG. 4 is a plot of Equation (1) for the case where $\sigma$=0.80. It will be appreciated that the frequency modulation is essentially linear over the entire range of $\delta n/n$. In order to resolve two peaks, the index variation should be sufficiently large to shift the resonance by at least one width, i.e., $\delta f > \Delta f$. Using Equation (1) along with the definition for Q, an expression for the minimum index change required to resolve two peaks is as follows:

$$\left|\frac{\delta n}{n}\right|_{\min} = \frac{1}{\sigma} \cdot \frac{1}{Q \pm 1} \approx \frac{1}{\sigma Q} \quad (2)$$

where the last part of the equation is valid for large values of Q. The +(−) sign in the denominator corresponds to a negative (positive) index change. Other embodiments of the invention may require a smaller index change than the one defined in Equation (2).

Figure 5:
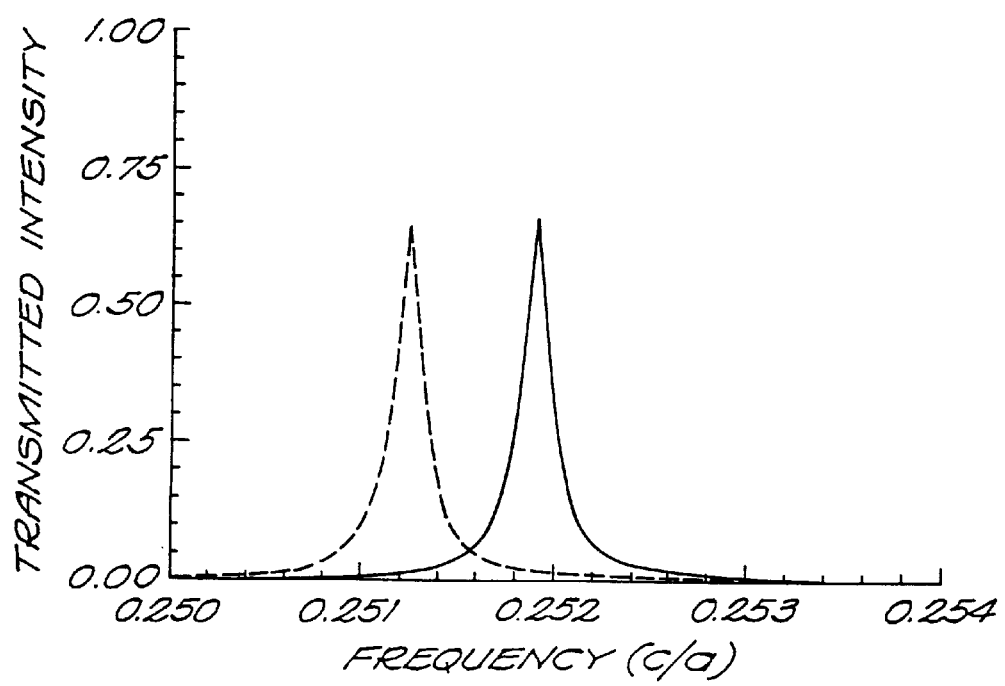
FIG. 5 is a plot of the spectrum of the original and transmitted pulses with and without index variation in the microcavity of FIG. 3A.

For the photonic crystal microcavity 300, the magnitude of the minimum index variation to resolve two peaks is $1 \times 10^{-3}$, as computed from Equation (2). A variation of $-3 \times 10^{-3}$ is introduced and the transmission is investigated. In this specific embodiment, the index variation is generated only inside the dielectric material in the outlined region 308 in FIG. 3A. The spectrum of the transmitted pulse 500 is shown in the plot of FIG. 5 along with the spectrum of the unshifted pulse 502. The resonant frequency is shifted upward since the index variation is negative. The two curves in FIG. 5 are clearly resolved.

One salient example of the possibilities that this waveguide microcavity permits is the design of an all-optical switch. If the cavity mode is designed to be centered at a frequency $f_o - \delta f$, and if a signal is transmitted at frequency $f_o$, then the switch could be turned "on" by shifting the resonance to $f_o$, and turned "off" by shifting it either back to $f_o - \delta f$ or to $f_o + \delta f$. Even if the resonance is shifted only part of this distance, the same device could be used as a modulator.

The switching speed is determined by the response time of the nonlinear material. In certain materials, the resonance may shift more quickly in one direction than in the other. To allow the switch to operate at the faster speed, one can place two microcavities in series. The first is initially in the "off" position, and the second is initially in the "on" position. To allow transmission, both cavities must be "on". This is accomplished by shifting the resonance of the first cavity upward. To turn the switch "off", the resonance of the second cavity is also shifted upward, but now with the effect of blocking the signal. Because it takes a longer time to reset the switch, this type of device is known as an on-off switch. Using DX-centers, the switch-on and switch-off times could be as short as one picosecond. Furthermore, the device would require an area of only a few $\mu m^2$ and less than 20 pJ of energy for switching.

In summary, a design of a tunable photonic crystal microcavity is presented which can be used in such devices as filters, modulators, switches, gates, channel drops, and interconnects. This microcavity can be fabricated in one-, two- or three-dimensionally periodic structures using nonlinear optical materials. It will be appreciated by those of skill in the art that while the invention has been described with respect to specific illustrated embodiments of one-, two-, and three-dimensionally periodic structures, other configurations with similar periodicity are possible.

The foregoing description has been set forth to illustrate the invention and is not intended to be limiting. Since modifications of the described embodiments incorporating the spirit and substance of the invention may occur to persons skilled in the art, the scope of the invention should be limited solely with reference to the appended claims and equivalents thereof.

What is claimed is:

1. A periodic structure comprising a defect positioned within said structure to define a microcavity, said structure comprising a nonlinear material and being adapted to have an induced variation in index of refraction so as to tune the resonant mode of said microcavity, wherein the frequency of said resonant mode is in the microwave regime.

2. The structure of claim 1, wherein said structure comprises one-dimensional periodicity.

3. The structure of claim 1, wherein said structure comprises two-dimensional periodicity.

4. The structure of claim 1, wherein said structure comprises three-dimensional periodicity.

5. The structure of claim 1, wherein the index of refraction is varied in response to an applied current or voltage to said nonlinear material.

6. The structure of claim 1, wherein the index of refraction is varied in response to an applied electromagnetic field or applied electromagnetic wave to said nonlinear material.

7. The structure of claim 1, wherein the index of refraction is varied in response to photoionization of DX centers of said nonlinear material.

8. The structure of claim 1, wherein the frequency of said resonant mode is varied in response to an applied current or voltage.

9. The structure of claim 1, wherein the frequency of said resonant mode is varied in response to an applied electromagnetic field or applied electromagnetic waves.

10. The structure of claim 1, wherein the frequency of said resonant mode is varied in response to photoionization of DX centers.

11. The structure of claim 1, wherein said structure comprises dielectric material.

12. The structure of claim 1, wherein said structure comprises metallodielectric material.

13. A periodic structure comprising a defect positioned within said structure to define a microcavity, said structure comprising a nonlinear material and being adapted to have an induced variation in index of refraction so as to tune the resonant mode of said microcavity, wherein said structure comprises metallic and dielectric materials.

14. The structure of claim 13, wherein said structure comprises one-dimensional periodicity.

15. The structure of claim 13, wherein said structure comprises two-dimensional periodicity.

16. The structure of claim 13, wherein said structure comprises three-dimensional periodicity.

17. The structure of claim 13, wherein the index of refraction is varied in response to an applied current or voltage to said nonlinear material.

18. The structure of claim 13, wherein the index of refraction is varied in response to an applied electromagnetic field or electromagnetic waves to said nonlinear material.

19. The structure of claim 13, wherein the frequency of said resonant mode is varied in response to an applied current or voltage.

20. The structure of claim 13, wherein the frequency of said resonant mode is varied in response to an applied electromagnetic field or applied electromagnetic waves.

21. A periodic structure comprising a defect positioned within said structure to define a microcavity, said structure comprising a nonlinear material and being adapted to have an induced variation in index of refraction in response to either an applied current or applied electromagnetic waves, or to third or higher order effects, so as to tune the resonant mode of said microcavity.

22. The structure of claim 21, wherein said structure comprises one-dimensional periodicity.

23. The structure of claim 21, wherein said structure comprises two-dimensional periodicity.

24. The structure of claim 21, wherein said structure comprises three-dimensional periodicity.

25. The structure of claim 21, wherein the response is effected by the photoionization of DX centers of said nonlinear material.

26. A periodic structure comprising a defect positioned within said structure to define a microcavity, said structure comprising a nonlinear material and being adapted to tune the resonant mode of said microcavity in response to either an applied current or applied electromagnetic waves, or to third or higher order effects.

27. The structure of claim 26, wherein said structure comprises one-dimensional periodicity.

28. The structure of claim 26, wherein said structure comprises two-dimensional periodicity.

29. The structure of claim 26, wherein said structure comprises three-dimensional periodicity.

30. The structure of claim 26, wherein the response is effected by the photoionization of DX centers of said nonlinear material.

31. A structure comprising:
a substrate;
a photonic crystal comprising a defect positioned within said photonic crystal to define a microcavity with either incident intensity or transmitted intensity parallel to said substrate, said structure comprising a nonlinear material and being adapted to have an induced variation in index of refraction so as to tune the resonant mode of said microcavity.

32. The structure of claim 31, wherein said structure comprises one-dimensional periodicity.

33. The structure of claim 31, wherein said structure comprises two-dimensional periodicity.

34. The structure of claim 31, wherein said structure comprises three-dimensional periodicity.

35. The structure of claim 31, wherein the index of refraction is varied in response to an applied current or voltage to said nonlinear material.

36. The structure of claim 31, wherein the index of refraction is varied in response to an applied electromagnetic field or electromagnetic waves to said nonlinear material.

37. The structure of claim 36, wherein the response is effected by the photoionization of DX centers of said nonlinear material.

38. The structure of claim 31, wherein the frequency of said resonant mode is varied in response to an applied current or voltage.

39. The structure of claim 31, wherein the frequency of said resonant mode is varied in response to an applied electromagnetic field or applied electromagnetic waves.

40. The structure of claim 39, wherein said response is effected by the photoionization of DX centers in said nonlinear material.

41. The structure of claim 31, wherein the frequency of said resonant mode is in the optical regime.

42. The structure of claim 31, wherein the frequency of said resonant mode is in the microwave regime.

43. The structure of claim 31, wherein said structure comprises dielectric material.

44. The structure of claim 43, wherein said structure comprises metallic material.

45. A method of tuning a photonic crystal comprising:
providing a dielectric periodic structure, said structure having a defect positioned to define a microcavity with a resonant mode, said structure comprising a nonlinear material; and
varying the index of refraction of said nonlinear material in response to either an applied current or applied electromagnetic waves, or to third or higher order effects.

46. A method of tuning a photonic crystal comprising:
providing a substrate;
providing a dielectric periodic structure, said structure having a defect positioned to define a microcavity with a resonant mode with either incident intensity or transmitted intensity parallel to the substrate, said structure comprising a nonlinear material; and
varying the index of refraction of said nonlinear material.

* * * * *